United States Patent Office.

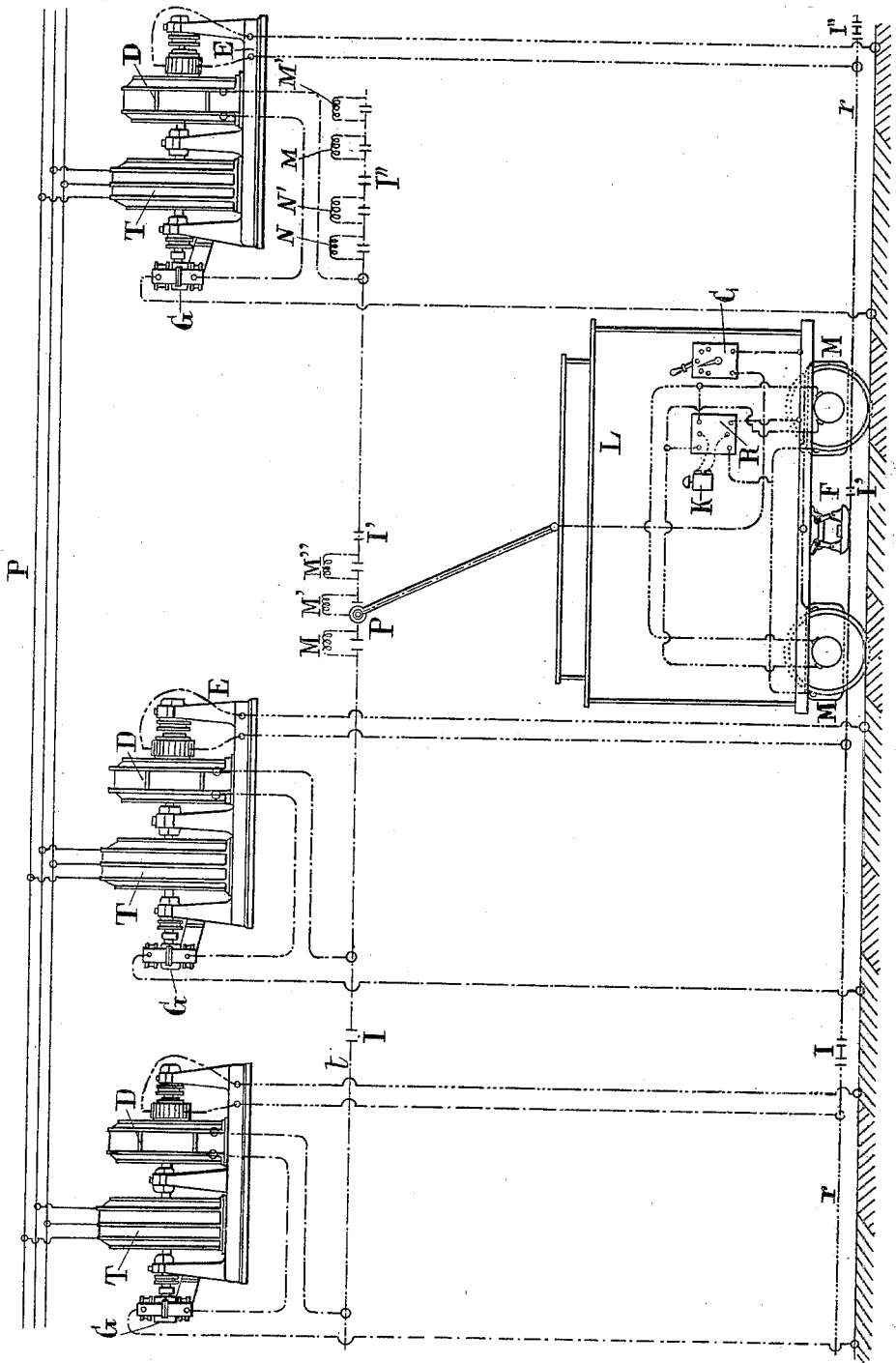

JEAN JACQUES HEILMANN, OF PARIS, FRANCE.

ELECTRIC RAILWAY OR TRAMWAY.

SPECIFICATION forming part of Letters Patent No. 622,466, dated April 4, 1899.

Application filed November 9, 1898. Serial No. 695,939. (No model.)

*To all whom it may concern:*

Be it known that I, JEAN JACQUES HEILMANN, a citizen of the Republic of France, and a resident of Paris, in the Department of Seine and Republic of France, have invented certain new and useful Improvements in Electric Railways or Tramways, of which the following is a specification.

The present invention relates to those systems of electric railways and tramways in which the current is supplied to the locomotives or to the carriages to be set in motion through a conductor fixed parallel with the permanent way.

This system consists in a particular method of distribution of the current and of operating the machines in such a manner as to avoid the use of controllers or apparatus acting by the interruption of the principal current or the introduction of resistances into its circuit. These controllers or apparatus are of difficult construction and are burdensome to keep in repair because of the rapid destruction of the contacts by sparking on rupture with very high pressure currents.

The annexed diagram represents the general arrangement of this improved system and will be hereinafter referred to.

As hereinafter described, the energy is supposed to be supplied under high pressure from a central station under the form of a three-phase electrical current. This current is transformed into continuous current at a certain number of substations, each of which includes a synchronous or an asynchronous alternate-current motor which drives a continuous-current dynamo. The continuous current therefrom is supposed to be transmitted to the motors which are to be energized through a third rail, following the method generally adopted on electric railways. According to this invention the third rail $r$ or its equivalent conductor which supplies the current is divided into a certain number of parts or sections insulated one from the other, each of these parts corresponding with one of the substations, and the principal current is regulated by varying the excitation of the machine which supplies it. This variation can be effected by means of a rheostat arranged upon the locomotive. Thus each substation includes an alternate-current motor T, energized under high pressure from the line P. This motor operates, first, the generator D, which feeds the local portion of the line $r$, and, second, the exciter G, destined to excite the machine D. For this purpose a second conductor $t$, which may be aerial, establishes communication between the exciter and the field-magnet of the dynamo D by the intermediary of a rheostat C on the locomotive L. The ordinary rails of the permanent way may be utilized to constitute the common return for the principal current and for the exciting-current. In other terms, two conductors $r$ and $t$ suffice for the system, the conductor $r$ feeding by the intermediary of the collector F the principal current to the motors M M and the conductor $t$ feeding the exciting-current. These two conductors may either be aerial or subterranean or may be placed at the level of the permanent way. In substitution for a continuous conductor there may be employed one of the known systems of communication by separate contacts, such as that of Clautt, of Diatto, or of Westinghouse.

Between the various sections of the principal conductor $r$ we may intercalate an insulated strip I I' I'' in such a manner as to avoid putting two neighboring sections into communication at the moment of passage of the rubber F.

In the exciting-conductor $t$, which is formed in sections like the principal conductor, there may be introduced in advance of one of the ends of one of these sections $i'$ a series of resistances M' in such a manner as to avoid the abrupt breaking of the exciting-circuit. On railways or tramways where the trains are called upon to run in both directions these resistances will be introduced at N N' before the end of one section and at M' at the commencement of the following section.

The electrical sectionizing of the line which is the characteristic of this system may be arranged to coincide with the sectionizing resulting from the adoption of the block system. In this event the employees in charge of the block-section can also attend to the electrical arrangements, and by this means the principal or the exciting current may be suppressed; also, the employee may by cutting off the supply-current stop a train already on the section. In the event of an accident occurring in a substation it will be sufficient to electrically unite that section with one of the neighboring sections by means of an interrupter, so that the service may nevertheless be regularly continued.

The conductor which supplies current to the motor is "live" or under pressure only at the moment of the passage of a train. At all other times it is neutral and may be worked upon without danger.

If on any section a train should require help, a relief-train can be arranged to travel to it. For this purpose the driver on the locomotive L moves his switch to a neutral point, this commutator R being that by means of which the direction of travel of the train is controlled. It is also possible to arrange the circuits in such a manner that when the commutator is put to a neutral point it introduces into the principal circuit a bell or other electric alarm apparatus, by means of which the driver's attention is attracted when the relief-train enters the section.

In the foregoing description it has been supposed that the motor T is constructed for alternate currents; but it will be evident that the same arrangement may be employed whatever may be the nature of the electrical energy which animates the generator D and the exciter G. These machines also may be driven by a continuous-current motor or by a steam-engine, a turbine, or the like. Similarly the generator D and the exciter G can each be driven by a separate motor. Finally, the generator D, which hereinbefore has been described as producing a continuous current, may be of the monophase of polyphase type, in which case the construction of the locomotive-motors will be correspondingly modified, and the feeding-circuit $r$ may comprise several separate conductors, if necessary.

Having now particularly described and ascertained the nature of my said invention and in what manner the same is to be performed, I declare that what I claim is—

1. An electric-railway system in which the alimentary current for the train-motors is furnished by a generator in a fixed station, said generator being excited by a special dynamo the field-circuit of which is controlled from the train by means of an auxiliary wire or conductor, substantially as hereinbefore described.

2. In an electric railway, the combination with two line conductors, of a dynamo connected with one of said conductors and to ground, an exciter for the field-circuit of said dynamo connected with the other conductor and to ground, a car-motor having one terminal grounded and the other connected with the dynamo-conductor, and a rheostat on the car having one terminal grounded and the other connected with the exciter-conductor, substantially as described.

3. In an electric railway, the combination with two line conductors, divided at the same points into insulated sections, of a dynamo for each section of one of said conductors, an exciter for the field-circuit of said dynamo connected with the corresponding section of the other conductor, ground connections for one terminal of the dynamo and the exciter one or more cars, each having a separate collector for each conductor, a motor on each car in the dynamo-circuit and a rheostat in circuit with the exciter, substantially as described.

4. In an electric railway, the combination with two line conductors, of a dynamo connected with one of said conductors, an exciter for the field-circuit of said dynamo connected with the other conductor, ground connections for one terminal of the dynamo and the exciter a common motor for the dynamo and its exciter, a car provided with two collectors, one for each conductor, a car-motor in the dynamo-circuit and devices on said car for varying the exciter-current, substantially as described.

5. In an electric railway, the combination with two line conductors, divided at the same points into insulated sections, of a dynamo for each section of one of said conductors, an exciter for the field-circuit of said dynamo connected with the corresponding section of the other conductor, a common motor for the dynamo and its exciter, mains supplying power to all of said motors, one or more cars, each having a separate collector for each conductor, and devices on each car for varying the exciter-current, substantially as described.

6. In an electric railway, a line conductor divided into sections insulated from each other, and resistances inserted in said sections near the ends thereof, substantially as described.

7. In an electric railway, two line conductors divided into sections insulated from each other, and resistances inserted in each section of one of said conductors near one or both ends thereof, substantially as described.

Signed at Paris, in the Department of Seine and Republic of France.

JEAN JACQUES HEILMANN.

Witnesses:
 HENRY DANZER,
 J. ALLISON BOWEN.